(12) United States Patent
Tye et al.

(10) Patent No.: US 9,328,191 B2
(45) Date of Patent: May 3, 2016

(54) RESIN FOR USE IN A COATING COMPOSITION

(75) Inventors: Anthony J. Tye, Waterville, OH (US); Ali A. Rihan, Toledo, OH (US); Jeff Pierce, Waterville, OH (US)

(73) Assignee: BASF COATINGS GMBH, Muenster (DE)

( * ) Notice: Subject to any disclaimer, the term of this patent is extended or adjusted under 35 U.S.C. 154(b) by 523 days.

(21) Appl. No.: 13/577,128

(22) PCT Filed: Feb. 4, 2011

(86) PCT No.: PCT/US2011/023745
§ 371 (c)(1),
(2), (4) Date: Oct. 2, 2012

(87) PCT Pub. No.: WO2011/097478
PCT Pub. Date: Aug. 11, 2011

(65) Prior Publication Data
US 2013/0035420 A1 Feb. 7, 2013

Related U.S. Application Data

(60) Provisional application No. 61/301,690, filed on Feb. 5, 2010.

(51) Int. Cl.
| | | |
|---|---|---|
| B32B 27/30 | (2006.01) |
| C09D 123/26 | (2006.01) |
| C09D 133/06 | (2006.01) |
| C09D 151/00 | (2006.01) |
| C08G 81/00 | (2006.01) |
| C08G 81/02 | (2006.01) |
| C08F 299/00 | (2006.01) |
| C08G 18/62 | (2006.01) |
| C08G 18/10 | (2006.01) |
| C08L 23/08 | (2006.01) |
| C08L 23/26 | (2006.01) |
| C08L 33/00 | (2006.01) |
| C08L 33/06 | (2006.01) |
| C08L 67/00 | (2006.01) |

(52) U.S. Cl.
CPC .......... *C08G 18/6204* (2013.01); *C08F 299/00* (2013.01); *C08G 18/10* (2013.01); *C08G 81/021* (2013.01); *C08L 23/0846* (2013.01); *C08L 23/0884* (2013.01); *C08L 23/0892* (2013.01); *C08L 23/26* (2013.01); *C08L 33/00* (2013.01); *C08L 33/062* (2013.01); *C08L 67/00* (2013.01); *C09D 123/26* (2013.01); *C08L 2205/05* (2013.01)

(58) Field of Classification Search
None
See application file for complete search history.

(56) References Cited

U.S. PATENT DOCUMENTS

| | | | |
|---|---|---|---|
| 4,528,329 A * | 7/1985 | Inoue et al. ............... 525/74 |
| 4,546,046 A | 10/1985 | Etzell et al. |
| 4,584,354 A | 4/1986 | Hudecek et al. |
| 4,921,776 A | 5/1990 | Taylor, Jr. |
| 5,290,633 A | 3/1994 | Devlin et al. |
| 5,639,554 A | 6/1997 | McGee et al. |
| 6,042,983 A | 3/2000 | Tavernier et al. |
| 6,410,147 B1 | 6/2002 | Chung et al. |
| 6,410,634 B2 | 6/2002 | Rufus et al. |
| 6,927,271 B2 | 8/2005 | Grandhee |
| 7,166,675 B2 | 1/2007 | Bartlett et al. |
| 8,697,194 B2 | 4/2014 | Odell et al. |
| 2004/0143073 A1 | 7/2004 | Bejko et al. |
| 2005/0136186 A1 | 6/2005 | Moens et al. |
| 2005/0137279 A1 | 6/2005 | Decker et al. |
| 2005/0153070 A1 | 7/2005 | Decker et al. |
| 2006/0089452 A1 | 4/2006 | Schneider et al. |
| 2007/0123649 A1 * | 5/2007 | Jackson et al. ............. 525/79 |

FOREIGN PATENT DOCUMENTS

| | | |
|---|---|---|
| CN | 101555365 A | 10/2009 |
| EP | 0786503 A2 | 7/1997 |
| EP | 1211269 A1 | 6/2002 |
| EP | 1333061 A1 | 8/2003 |
| JP | 2006-083373 A | 3/2006 |
| WO | WO 99/16618 A1 | 4/1999 |
| WO | WO 20071038361 A2 | 4/2007 |
| WO | WO 2011/058119 A1 | 5/2011 |

OTHER PUBLICATIONS

The University of Southern Mississippi, Polymer Science Learning Center (Department of Polymer Science): "Tacticity" (2005); http://pslc.ws/macrog/tact.htm.*
Oswald et al. "Materials Science of Polymers for Engineers", section 2.4: Conformation and Configuration of Polymer Molecules, pp. 28-31 (1996).*
International Search Report for Application No. PCT/US2011/023745 dated Apr. 28, 2011, 4 pages.
English language abstract for CN 101555365 extracted from espacenet.com database on May 28, 2014, 34 pages.
English language abstract and machine-assisted English translation for JP 2006-083373 extracted from espacenet.com database on Apr. 1, 2015, 33 pages.

* cited by examiner

*Primary Examiner* — Michael J Feely
(74) *Attorney, Agent, or Firm* — Howard & Howard Attorneys PLLC

(57) ABSTRACT

A coating system comprises a substrate and a cured film disposed on the substrate and formed from a coating composition. The coating composition comprises a solvent component and a resin. The resin comprises a reaction product of a polyolefin and an oligomer or polymer. The polyolefin, different from the oligomer or polymer, has a functional group that is reactive with the oligomer or polymer and the functional group is selected from acrylate, methacrylate, carboxyl, hydroxyl, epoxide, anhydride and isocyanate functional groups. The oligomer or polymer and the polyolefin are at least partially immiscible in solution at ambient temperature. The oligomer or polymer is grafted with the polyolefin to form the resin.

17 Claims, No Drawings

RESIN FOR USE IN A COATING COMPOSITION

RELATED APPLICATIONS

This patent application is the National Stage of International Patent Application No. PCT/US2011/023745, filed on Feb. 04, 2011, which claims priority to and all advantages of U.S. Provisional Patent Application No. 61/301,690, filed on Feb. 05, 2010.

BACKGROUND OF THE INVENTION

1. Field of the Invention

The subject invention generally relates to a resin for use in a coating composition. More specifically, the subject invention relates to a resin that provides a cured film formed from the coating composition with low gloss.

2. Description of the Related Art

Coating compositions are typically applied to a substrate to provide the substrate with certain functional and aesthetic qualities, such as color, appearance, and protection. For example, coating compositions may be used to enhance appearance by providing the substrate with high or low gloss. Gloss is a measure of specular reflection and results when light reflects off a smooth substrate so that an angle of incidence is equal to an angle of reflection. Substrates with high gloss typically reflect a high proportion of specular light and are characterized by a shiny appearance. In contrast, substrates with low gloss typically reflect a low proportion of specular light and are characterized by a dull or matte appearance.

Many existing coating compositions for applications requiring low gloss are designed to include a flattening agent, such as fumed silica, in the coating composition. The flattening agent disrupts reflection of specular light. Consequently, increased levels of flattening agent provide cured films formed from the coating composition with decreased gloss. However, increased levels of flattening agent also detrimentally increase manufacturing costs of the coating composition.

Further, coating compositions including increased levels of flattening agent are prone to settling, i.e., the coating compositions are unstable. Unstable coating compositions have poor shelf life and cannot be stored for desired durations without affecting viscosity and spray-ability of the coating composition.

Additionally, at increased levels, flattening agents tend to coagulate in the coating composition. As a result, cured films formed from coating compositions including increased levels of flattening agent typically have inconsistent gloss levels over time, an unacceptable seedy appearance and do not exhibit an acceptable matte finish.

Finally, coating compositions including increased levels of flattening agent typically form cured films that are brittle and exhibit poor durability.

SUMMARY OF THE INVENTION AND ADVANTAGES

The subject invention provides a coating system. The coating system comprises a substrate and a cured film disposed on the substrate and formed from a coating composition. The coating composition comprises a solvent component and a resin. The cured film has a gloss of less than 35 gloss units (%) and optimally less than 10 gloss units (%) as measured by a glossmeter at 20°. Gloss units are the percentage of the amount of light reflected at the angle of 20°.

The resin comprises a reaction product of an oligomer or polymer and a polyolefin. The oligomer or polymer is selected from acrylics, esters, urethanes, and isocyanates. The oligomer or polymer optionally has reactive functionality thereon selected from hydroxyl, carboxyl, anhydride, isocyanate and epoxide functional groups. The polyolefin is different from the oligomer or polymer and has a functional group selected from carboxyl, hydroxyl, anhydride, acrylate, methacrylate, epoxide, and isocyanate functional groups. The functional group of the polyolefin is reactive with the oligomer or polymer. The oligomer or polymer and the polyolefin are at least partially immiscible in solution at ambient temperature.

The subject invention also provides a method of forming the resin. For the method, the oligomer or polymer and the polyolefin are provided, and the oligomer or polymer is grafted with the polyolefin to form the resin.

The coating composition including the resin adequately provides cured films formed from the coating composition with low gloss, while minimizing levels of flattening agents such as silica in the coating composition and without detrimentally increasing manufacturing costs of the coating composition. Further, the resin provides the coating composition with excellent stability and shelf life. Additionally, the coating composition including the resin is capable of forming non-brittle, durable cured films that exhibit acceptable matte finishes without unacceptable seedy appearance.

DETAILED DESCRIPTION OF THE INVENTION

The present invention includes a resin, a method of forming the resin, and a coating system comprising the resin. The resin of the present invention is typically useful for applications requiring low gloss automotive coating compositions. However, it is to be appreciated that the resin of the present invention can have applications beyond automotive coating compositions, such as in coil coating compositions.

The coating system comprises a substrate and a cured film disposed on the substrate. The substrate may be any substrate known in the art. Typically, the substrate is metal, such as steel or aluminum. In one embodiment, the substrate is a component of an automobile, such as a pillar, a center post, or a window sash.

The cured film is formed from a coating composition comprising a solvent component and a resin. The solvent component of the coating composition typically includes an organic solvent or a mixture of solvents. One skilled in the art typically selects the solvent component to evaporate readily during formation of the cured film. Suitable solvents include, but are not limited to, glycols, esters, ether-esters, glycol-esters, ether-alcohols, aliphatic hydrocarbons, aromatic hydrocarbons, ketones, and combinations thereof. Specific examples of suitable solvent components include Oxsol 100, Aromatic 100, Aromatic 150, methyl acetate, and methyl amyl ketone.

The resin of the coating composition comprises a reaction product of an oligomer or polymer and a polyolefin. The oligomer or polymer is selected from acrylics, esters, urethanes and isocyanates. The oligomer or polymer optionally has reactive functionality thereon. When present, the reactive functionality of the oligomer or polymer is selected from hydroxyl, carboxyl, anhydride, isocyanate, and epoxide functional groups. In certain embodiments, the oligomer or polymer has the reactive functionality set forth above for grafting with the polyolefin, as described in greater detail below. The oligomer or polymer may include excess functionality that undergoes crosslinking or may include a different functionality to undergo crosslinking. For example the oligomer or polymer may be an acrylic resin with epoxide grafting functionality and include hydroxyl functionality for crosslinking.

Oligomeric esters and polyesters are formed by reaction of polyols or other alcohols with carboxylic acids or acid anhydrides. Suitable examples of polyols for making the polyesters include alkylene glycols, such as ethylene glycol, propylene glycol, butylene glycol and neopentyl glycol, and other glycols such as hydrogenated bisphenol A, cyclohexanedimethanol, caprolactone-diol reaction products, hydroxyalkylated bisphenols, polyether glycols, e.g., poly(oxytetramethylene) glycol, and similar type compounds. Other diols of various types and polyols of higher functionality can also be used. Such higher polyols include trimethylolpropane, trimethylolethane, pentaerythritol and higher molecular weight polyols, such as obtained by the reaction product of ethylene oxide and trimethylolpropane and various hydrolyzed epoxide resins. Suitable carboxylic acids used in the reaction with the above-described polyols include phthalic, isophthalic, terephthalic, tetrahydrophthalic, hexahydrophthalic, adipic, azelaic, sebacic, maleic, glutaric, chlorendic, tetrachlorophthalic, maleic, fumaric, itaconic, malonic, suberic, 2-methylsuccinic, 3,3-diethylglutaric, 2,2-dimethylsuccininc acid and trimellitic acid. Anhydrides of these acids where they exist can also be employed and are encompassed by the term "carboxylic acid." Monocarboxylic acids such as benzoic acid and hexanoic acid can also be used, provided the average functionality of the polyol components is above about 2.0. Saturated acids (including those aromatic acids where the only unsaturation is in the aromatic ring) are preferred. Where ecaprolactone is used to form a polyester or oligomeric ester, the oligomer or polymer is not required to be functionalized, as the polyester ring opens during the reaction with the polyethylene and the OH functional polylethylene reacts to form a polyester segment.

The term urethane refers in the present invention to those types generally used in baking and ambient cure applications. Typically, these urethanes are a result of a stoichiometric blend of polyol (or other alcohol) with an isocyanate. Often, monohydric alcohols or monoisocyanates may be blended to control the molecular weight. Examples of polyols include those previously listed above for making oligomeric esters or polyesters. Examples of polyisocyanates include toluene diisocyanate, diphenylmethane diisocyanate, hexamethylene diisocyanate, isophorone diisocyanate, dicyclohexyl methane diisocyanate, biurets of and isocyanurates of the aforementioned where they exist, etc.

Oligomeric acrylics and acrylic polymers may be formed from one or more monomers having groups reactive with the crosslinker or groups that can later be derivatized to provide groups reactive with the crosslinker, preferably along with one or more comonomers. Examples of such monomers and co-monomers include, without limitation, alpha, beta-ethylenically unsaturated monocarboxylic acids containing 3 to 5 carbon atoms such as acrylic, methacrylic, and crotonic acids and the esters of those acids; alpha, beta-ethylenically unsaturated dicarboxylic acids containing 4 to 6 carbon atoms and the anhydrides, monoesters, and diesters of those acids; vinyl esters, vinyl ethers, vinyl ketones, and aromatic or heterocyclic aliphatic vinyl compounds. Representative examples of suitable esters of acrylic, methacrylic, and crotonic acids include, without limitation, those esters from reaction with saturated aliphatic and cycloaliphatic alcohols containing 1 to 20 carbon atoms, such as methyl, ethyl, propyl, isopropyl, n-butyl, isobutyl, tert-butyl, 2-ethylhexyl, lauryl, stearyl, cyclohexyl, trimethylcyclohexyl, tetrahydrofurfuryl, stearyl, sulfoethyl, and isobornyl acrylates, methacrylates, and crotonates; hydroxyethyl acrylate, hydroxyethyl methacrylate, hydroxypropyl acrylate, hydroxypropyl methacrylate, hydroxybutyl acrylate, and hydroxybutyl methacrylate; and polyalkylene glycol acrylates and methacrylates. Representative examples of other ethylenically unsaturated polymerizable monomers include, without limitation, such compounds as fumaric, maleic, and itaconic anhydrides, monoesters, and diesters with alcohols such as methanol, ethanol, propanol, isopropanol, butanol, isobutanol, and tert-butanol. Representative examples of polymerization vinyl monomers include, without limitation, such compounds as vinyl acetate, vinyl propionate, vinyl ethers such as vinyl ethyl ether, vinyl and vinylidene halides, and vinyl ethyl ketone. Representative examples of aromatic or heterocyclic aliphatic vinyl compounds include, without limitation, such compounds as styrene, .alpha.-methyl styrene, vinyl toluene, tert-butyl styrene, and 2-vinyl pyrrolidone. The co monomers may be used in any combination. Carbamate-functional acrylic polymers may be prepared as described, for example, by McGee et al. in U.S. Pat. No. 5,639,554, incorporated herein by reference.

Modified acrylics can also be used as the oligomer or polymer of the film-forming component of the invention. Such acrylics are typically ester-modified acrylics or urethane-modified acrylics, as is well known in the art. An example of one preferred ester-modified acrylic is an acrylic polymer modified with delta-caprolactone. Such an ester-modified acrylic is described in U.S. Pat. No. 4,546,046 of Etzell et al, the disclosure of which is incorporated herein by reference. Urethane-modified acrylics are also well known in the art. They are described, for example, in U.S. Pat. No. 4,584,354, the disclosure of which is incorporated herein by reference.

Molecular weight of the oligomeric acrylics or acrylic polymers ranges from 1,000 to 25,000, more typically 2000 to 10,000 and most typically between 2,500 and 4,000 number average molecular weight as determined by gel permeation chromatography using a monodispersed polystyrene standard. The Tg of the acrylic polymer is generally between −20° to 60° C. and in some embodiments is between 5° C. and 60° C. as measured by differential scanning calorimetry.

The polyolefin is different from the oligomer or polymer. That is, the oligomer or polymer does not comprise a polyolefin. The polyolefin has a functional group selected from carboxyl, hydroxyl, epoxide, isocyanate, anhydride, acrylate and methacrylate functional groups. The functional group of the polyolefin is reactive with the oligomer or polymer. Typically, the functional group of the polyolefin is selected from carboxyl groups, hydroxyl groups, and mixtures thereof. One skilled in the art typically selects the polyolefin and the functional group based on desired reactivity with the reactive functionality of the oligomer or polymer. For example, in an embodiment where the reactive functionality of the oligomer or polymer is isocyanate functionality, the functional group of the polyolefin may be a hydroxyl functional group to ensure reactivity of the polyolefin with the oligomer or polymer. In an alternative embodiment, the polyolefin has carboxyl functionality and the oligomer or polymer has epoxy functionality. As discussed above, the oligomer or polymer may include functionality in excess of that needed for grafting for crosslinking with a crosslinking resin or additional functionality different from the grafting functionality for crosslinking.

The polyolefin typically has a number average molecular weight of from 350 to 700 g/mol as determined by vapor pressure osmometry. The polyolefin typically has a melt temperature of from 85 to 110° C. The polyolefin is typically selected from the group of polyethylene, polypropylene, polybutylene, and combinations thereof. In one embodiment, the polyolefin is a crystalline polyalkylene. For example, the crystalline polyalkylene may be crystalline polyethylene. A suitable example of a hydroxyl functional polyolefin is commercially available under the trade name Unilin® from Baker-Petrolite of Tulsa, Okla. A suitable carboxyl functional polyolefin is commercially available under the tradename Unicid® from Baker-Petrolite of Tulsa, Okla.

The oligomer or polymer and the polyolefin are at least partially immiscible in solution at ambient temperature. It is to be appreciated that the term ambient means from about 18 to about 23° C. It is to be appreciated that the term partially immiscible means that the oligomer or polymer and the polyolefin form at least a partial emulsion and a heterogeneous phase in any proportion when mixed together. That is, the oligomer or polymer typically at least partially does not mix with the polyolefin, i.e., the oligomer or polymer and the polyolefin are typically incompatible.

The oligomer or polymer typically has a first polarity and the polyolefin typically has a second polarity that is opposite the first polarity. That is, the oligomer or polymer and the polyolefin are typically selected to have opposite polarities. Typically, the oligomer or polymer and the polyolefin are at least partially immiscible in solution at ambient temperature because the oligomer or polymer and the polyolefin typically have opposite polarities. Without intending to be limited by theory, it is believed that the cured film formed from the coating composition comprising the resin of the present invention has low gloss because of the opposite polarities and at least partial immiscibility of the oligomer or polymer and the polyolefin.

The oligomer or polymer is typically reacted to form the resin in an amount of from 50 to 85 parts by weight based on 100 parts by weight of the components utilized to form the resin. The polyolefin is typically reacted to form the resin in an amount of from 15 to 50 parts by weight based on 100 parts by weight of the components utilized to form the resin. Without intending to be limited by theory, it is believed the polyolefin is typically present in the resin in the above amount to provide the cured film formed from the coating composition with low gloss, i.e., a matte appearance. One skilled in the art typically selects the amount of polyolefin in the resin to manipulate the gloss of the cured film formed from the coating composition to provide the cured film with low gloss.

The coating composition comprising the resin may further comprise an additive component. The additive component of the coating composition may further include any additive known in the art. Suitable additives include, but are not limited to, catalysts, fillers, UV inhibitors, antioxidants, initiators, accelerators, surface tension modifiers, flattening agents, stabilizers, wax solutions, and defoamers.

Importantly, although the coating composition of the present invention may include flattening agents, such as silica, the resin of the present invention is typically useful for replacing some or all of the flattening agents in the coating composition. That is, the resin adequately provides the cured film formed from the coating composition with low gloss, while minimizing or eliminating the need for flattening agents such as silica in the coating composition. Since silica is an expensive additive component, the resin also provides the cured film with low gloss without increasing the cost of the coating composition. A further advantage is achieved in that conventional coating compositions including increased levels of flattening agent are prone to settling, i.e., the conventional coating compositions are unstable as compared to coating compositions comprising the resin of the present invention.

The additive component may also include pigment, when the coating is formulated as a pigmented topcoat. The pigment is typically included in the coating composition to impart color to the cured film formed from the coating composition. Such pigments are typically known in the art and are selected by one skilled in the art according to desired color, durability, weather resistance, and chemical resistance. Suitable pigments include inorganic metal oxides, organic compounds, metal flake, micas, extender or fillet pigments, and corrosion-inhibitive pigments such as chromates, silicas, silicates, phosphates, molybdates, and combinations thereof.

In another embodiment, the additive component does not include the pigment and the coating composition is typically useful as a clearcoat. The clearcoat is typically applied over a first cured layer formed from a color coat to impart low gloss to the first cured layer, as set forth above. Without intending to be limited by theory, it is believed that the opposite polarities of the oligomer or polymer and the polyolefin provide the resin with the ability to disrupt reflection of specular light so that increased levels of the resin provide the cured film formed from the coating composition with decreased gloss.

The coating compositions of the invention generally have a film-forming component that forms a thermoplastic or thermosetting film via solvent evaporation or chemical crosslinking respectively. Thermoplastic films formed by solvent evaporation are typically referred to as lacquers. Examples of resins used in suitable lacquers include but are not limited to nitrocellulose, cellulose acetate butyrate, acrylics, polyurethanes, and the like. Preferred are acrylics and polyurethanes. Preferred are thermoset films produced by a crosslinking reaction between the resin formed from the reaction of the oligomer or polymer and a polyolefin having one or more functional groups and a crosslinking agent having one or more groups reactive with the functional groups of the resin. As discussed above, the crosslinking functionality of the resin is contributed by the oligomer or polymer and is a result of excess grafting functionality or additional, distinct functionality thereon. Examples of suitable crosslinking agents useful in such coating compositions include isocyanate functional resins, aminoplast resins, epoxy functional resins, acid functional resins and the like. Particularly useful examples of crosslinking agents useful in coating compositions according to the present invention are isocyanate, aminoplast, and epoxy functional resins. In one embodiment of the invention a particularly useful crosslinker is hexamethylene diisocyanurate trimer.

Epoxy functional resins are typically those constructed through reaction of an oxirane functional group with a phenolic or carboxylic acid group. These resins are often a stoichiometric blend of ephichlorhydrin with phenolics such as bisphenol A or novalac resins, and derivatives thereof, or oxirane functional resins, such as acrylic resins prepared with glycidyl acrylate or methacrylate, and derivatives thereof.

Aminoplast resin refers to melamine or urea formaldehyde resins. Illustrative examples include but are not limited to monomeric or polymeric melamine resins, partially or fully alkylated melamine resins, methylol ureas such as urea formaldehyde and alkoxy ureas such as butylated urea formaldehyde.

In one embodiment, the film-forming component will comprise an isocyanate functional crosslinking agent. Suitable isocyanate functional crosslinking agents include polyisocyanates that are aliphatic, including cycloaliphatic polyisocyanates, and some aromatic isocyanurates. Useful aliphatic polyisocyanates include aliphatic diisocyanates such as ethylene diisocyanate, 1,2-diisocyanatopropane, 1,3-diisocyanatopropane, 1,6-diisocyanatohexane, 1,4-butylene diisocyanate, lysine diisocyanate, hexamethylene diisocyanate (HDI), 1,4-methylene bis-(cyclohexylisocyanate) and isophorone diisocyanate. Useful aromatic isocyanurates include the various isomers of α,.α,.α',.α.'-tetramethyl xylene diisocyanate. Aliphatic polyisocyanates are preferred, particularly hexamethylene diisocyanate and isophorone diisocyanate.

Also suitable for use are the biurets, alophonates and/or isocyanurates of such aliphatic or aromatic polyisocyanates. Preferred for use as crosslinking agents in the film-forming components of the invention are the biurets and isocyanurate of polyisocyanates, especially of the aliphatic polyisocyanates such as hexamethylene diisocyanate and isophorone diisocyanate. Most preferred for use as crosslinking agents are the biurets and isocyanurates of hexamethylene diisocyanate.

The crosslinking component is selected on the basis of the reactive functionality of the oligomer or polymer. For example if the oligomer or polymer comprises hydroxyl functional groups, the crosslinker would preferably be an isocyanate. If the oligomer or polymer comprises isocyanate functional groups the preferred crosslinker would be a polyol. Where the oligomer or polymer comprises acid functionality the preferred crosslinker would be epoxy functional.

For cure, it is preferable to maintain a cure temperature below the melt transition point of the polyolefin to obtain a lower gloss surface. Typically temperatures above the melt transition point of temperature of the polyolefin result in a glossier surface. The preferred cure temperature is between ambient temperature, 18° C. (65° F.) and 60° C. (140° F.). The cure temperature for a coating composition that utilizes an unblocked isocyanate crosslinker is typically between 60° F. (15.55° C.) to 90° F. (32° C.). The cure temperature for a coating composition containing melamine is between 70° C. and 110° C. However the use of melamine as a crosslinker may provide a higher gloss coating than coatings containing other crosslinking components. Heat is generally provided by an open heat source such as an oven, forced heated air, lamps, or other suitable heat source. Generally a flat appearance gloss is less than 35% reflectance on a 20 degree angle, in another embodiment less than 25% reflectance on a 20 degree angle, and in yet another embodiment is less than 10% reflectance on 20 degree gloss.

Cross-linked coating compositions form cured films that are typically more durable than cured films formed from non-cross-linked coating compositions. However, importantly, without intending to be limited by theory, it is believed that the low gloss of the cured films formed from the coating composition including the resin of the present invention is typically not dependent on cross-linking.

The coating composition of the present invention is stable, has excellent shelf life, and can be stored for necessary durations without affecting viscosity and spray-ability of the conventional coating composition. The coating composition minimizes flattening agent coagulation that typical occurs with conventional coating compositions. Additionally, the coating composition forms non-brittle, durable cured films that exhibit acceptable matte finishes without unacceptable seedy appearance.

The cured film formed from the coating composition has a gloss of less than 10 gloss units as measured by a glossmeter at 20°. That is, the coating composition is typically has low gloss. The glossmeter may be any glossmeter known in the art. A suitable glossmeter for measuring the gloss of the cured film is a Byk-Gardner micro-tri-gloss glossmeter. The coating composition is typically useful for applications requiring reflectance of a low proportion of specular light, and that may be characterized by a dull or matte appearance.

The method of forming the resin of the present invention comprises the steps of providing the oligomer or polymer, providing the polyolefin, and grafting the oligomer or polymer with the polyolefin to form the resin. To graft the oligomer or polymer with the polyolefin, one skilled in the art typically uses any method for grafting polymers known in the art, such as free-radical graft polymerization. The oligomer or polymer and the polyolefin are typically grafted at a temperature of from 60 to 160° C., where temperature is dictated by the reactants being used.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The following examples are intended to illustrate the invention and are not to be viewed in any way as limiting to the scope of the invention.

EXAMPLES

Example #1

A 5 liter, 4 neck, round bottom flask was fitted with a condenser, a nitrogen feed, and a thermocouple. To that flask, aromatic 100 solvent (159.9 gms.) and methyl n-amyl ketone (240.0 gms.) was charged and heated to 145° C. A monomer mix of methyl methacrylate (463.2 gms.), 2-ethylhexyl acrylate (240.5 gms.), hydroxypropyl methacrylate (428.4 gms.), glycidyl methacrylate (68.4 gms.), and aromatic 100 solvent (30.0 gms.) was fed concurrently with an initiator solution of t-butylperoxy acetate (39.5 gms.), mineral spirits (39.5 gms.), and aromatic 100 solvent (30.0 gms.) to the flask over three hours, maintaining the 145° C. temperature. The mixture was held for one hour at 145° C. The temperature was then reduced to 110° C. and an initiator solution of t-butyl peroctoate (0.6 gms.) and aromatic 100 solvent (12.0 gms.) was added to the flask over 15 minutes. The contents of the flask were held at 110° C. for two hours. Unicid™ 700 (Baker-Petrolite, 240.0 gms.) was then charged to the flask and the contents heated to 155° C. and held at that temperature until an acid value titration (ASTM D 974) of less than 1.0. The flask contents are then cooled and reduced with xylenes to a non-volatile content of 40%. The resin was filtered through a 50 micron mesh. The resin solution is milky in appearance.

Example #2

A 3 liter, 4 neck, round bottom flask was fitted with a condenser, a nitrogen feed, and a thermocouple. To that flask, aromatic 100 solvent (53.6 gms.), methyl n-amyl ketone (80.2 gms.), and Unicid 350™ (Baker-Petrolite, 80.1 gms.) was charged and heated to 145° C. A monomer mix of methyl methacrylate (153.6 gms.), n-butyl methacrylate (40.0 gms.), hydroxypropyl methacrylate (122.7 gms.), n-butyl acrylate (40.0 gms.), glycidyl methacrylate (43.7 gms.), and aromatic 100 solvent (10.1 gms.) was fed concurrently with an initiator solution of t-butylperoxy acetate (13.2 gms.), mineral spirits (13.2 gms.), and aromatic 100 solvent (10.0 gms.) to the flask over three hours, maintaining the 145° C. temperature. The mixture was held for one hour at 145° C. The temperature was then reduced to 110° C. and an initiator solution of t-butyl peroctoate (0.2 gms.) and aromatic 100 solvent (4.0 gms.) was added to the flask over 15 minutes. The contents of the flask were held at 110° C. for two hours. The flask and the contents were heated to 155° C. and held at that temperature until an acid value titration (ASTM D 974) of less than 2.0. The flask contents are then cooled and reduced with parachlorobenzotrifluoride to a non-volatile content of 40%. The resin was filtered through a 50 micron mesh. The resin solution is milky in appearance.

Example #3

A 5 liter, 4 neck, round bottom flask was fitted with a condenser, a nitrogen feed, and a thermocouple. To that flask, 1,6-hexanediol (71.2 gms.), hexahydrophthalic anhydride (451.2 gms.), 1,4-cyclohexanedimethanol (248.0 gms.), trimethylol Propane (107.1 gms.), 1,4-cyclohexanedicarboxylic acid (2.0 gms.), neopentyl glycol (4.5 gms.), Unilin 550™ (Baker-Petrolite, 88.5 gms.) and dibutyltin oxide (1.1 gms.) was charged and heated to reflux (190° C.). The reflux temperature continued to drop to 160° C. and held until an acid value titration (ASTM D 974) of 124.5 mg. KOH was reached. The flask was then fitted with a Dean-Stark trap and xylenes (19.8 gms.) was added to the flask. Water was removed from the flask via the Dean-Stark trap and the reflux temperature gradually increased to 225° C. The flask contents were held at 225° C. until an acid value titration of less than 1 mg. KOH was reached. The contents were then cooled and diluted with xylenes (81.1 gms.) and n-butyl acetate (519.4 gms.). The resulting non-volatile content was 59.7% and the viscosity was 621 cps. The resin was filtered through a 50 micron mesh. The resin solution is milky in appearance.

Example #4

A 1 liter, 4 neck, round bottom flask was fitted with a condenser, a nitrogen feed, and a thermocouple. To that flask, Desmodur™ N-3300 (Bayer, 224.3 gms.), Unilin 700™ (Baker-Petrolite, 96.1 gms.), and aromatic 100 solvent (206.2 gms.) was charged and heated to 105° C. The contents of the flask were held at 105° C. for six hours. Dibutyltin dilaurate (0.07 gms.) and xylenes (7.3 gms.) were then charged and the contents of the flask were held an additional two hours at 105° C. The resin was then cooled and reduced to 45.3% non-volatile with methyl isobutyl ketone. The resultant resin solution had a %NCO value (ASTM D 2572-87) of 6.1%. The resin was filtered through a 50 micron mesh. The resin solution is milky in appearance.

Example #5

A 1 liter, 4 neck, round bottom flask was fitted with a condenser, a nitrogen feed, and a thermocouple. To that flask, Desmodur™ N-3600 (Bayer, 223.8 gms.), Unilin 700™ (Baker-Petrolite, 82.9 gms.), Tone™ 210 (Dow, 24.9 gms.) and aromatic 100 solvent (142.1 gms.) was charged and heated to 105° C. The contents of the flask were held at 105° C. for six hours. Dibutyltin dilaurate (0.07 gms.) and xylenes (7.3 gms.) were then charged and the contents of the flask were held an additional two hours at 105° C. The resin was then cooled and aromatic 100 solvent (90.8 gms.) was added. The resin was reduced to 45.1% non-volatile with methyl isobutyl ketone. The resultant resin solution had a %NCO value (ASTM D 2572-87) of 5.8%. The resin was filtered through a 50 micron mesh. The resin solution is milky in appearance.

Example #6

"A" Component

| INGREDIENT | PERCENT |
| --- | --- |
| Acrylic from Example #1 | 65.42 |
| Dibutyltin Dilaurate | 0.07 |
| Byk ® 331 (Byk-Chemie) | 0.20 |
| Tinuvin 5941R (Ciba-Giegy) | 0.72 |
| Parachlorobenzotrifluoride | 22.35 |
| Methyl n-Amyl Ketone | 1.00 |
| DF21 (BASF Corp.) | 10.24 |

"B" Component 923-4535 Isocyanate Hardener, commercially available from BASF Corporation. "A" and "B" components were mixed in a volumetric ratio of 2:1 and applied via air atomization over a black basecoated substrate, allowed to air dry for 15 minutes and baked at 140° F. for 30 minutes, then allowed to cure for 1 week at 73° F. The film build of the clearcoat was 2.5 mils dry. The resultant film had a 20° gloss of 8%.

Example #7

R-M DC-92 commercial acrylic polyol based clearcoat from BASF Corporation, R-M VR0 low VOC reducer commercially available from BASF Corporation, and the Hardener Example #1 were combined in a 1:1:1 volumetric ratio and applied via air atomization to a primed aluminum panel. The coating was allowed to air dry for 10 minutes then forced dried at 140° F. for 30 minutes and, then allowed to cure for 1 week at 73° F. The film build of the clearcoat was 2.2 mils. dry. The resultant film had a 20° gloss of 5%.

Example #8 (Comparative)

Glasurit 923-55 urethane acrylic extra matte clearcoat, commercially available from BASF Corporation, is a silica containing matte clearcoat. Glasurit 923-55 clearcoat, was combined with 929-91 isocyanate hardener, commercially available from BASF Corporation, and 352-91 reducer, commercially available from BASF Corporation, in a 2:1:10 ratio and applied via air atomization over a black basecoated substrate, allowed to air dry for 15 minutes and baked at 140° F. for 30 minutes, then allowed to cure for 1 week at 73° F. The film build of the clearcoat was 2.4 mils dry. The resultant film had a 20° gloss of 2%.

Accelerated Weathering

Panels prepared with Clearcoat Example #6 and #8 were subjected to accelerated weathering testing according to ASTM D4587. After 1000 hours of exposure, the panel coated with Clearcoat Example #8 exhibited some slight signs of film haze while panels coated with Clearcoat Example #6 did not.

Settling

The Clearcoat Example #6 "A" component was allowed to stand at 73° F. for 24 days and evaluated for settling. No settling was observed.

The Hardener Example #5 was allowed to stand at 73° F. for 24 days and evaluated for settling. No settling was observed.

Example 8, Glasurit 923-55 was allowed to stand at 73° F. for 24 days and evaluated for settling. Some soft settling was observed.

Heat Accelerated Shelf Stability

The Clearcoat Example #6 "A" component was allowed to stand at 120° F. for 35 days and evaluated for settling. No settling was observed.

The Clearcoat Example #6 "A" component and 923-4535 Isocyanate Hardener (commercially available from BASF) components were mixed in a volumetric ratio of 2:1 and applied via air atomization over a black basecoated substrate, allowed to air dry for 15 minutes and baked at 140° F. for 30 minutes, then allowed to cure for 1 week at 73° F. The resultant film had a 20° gloss of 8%; no change in gloss from the initial application.

The Hardener Example #5 was allowed to stand at 120° F. for 35 days and evaluated for settling. No settling was observed.

R-M DC-92 (commercially available from BASF Corporation), R-M VR0 reducer (commercially available from BASF Corporation) and the Hardener Example #5 were combined in a 1:1:1 volumetric ratio and applied via air atomization to a primed aluminum panel. The coating was allowed to air dry for 10 minutes then forced dried at 140° F. for 30 minutes and, then allowed to cure for 1 week at 73° F. The resultant film had a 20° gloss of 5%; no change in gloss from the initial application.

Glasurit 923-55 clearcoat commercially available BASF Corporation, was allowed to stand at 120° F. for 35 days and evaluated for settling. Some settling was observed.

Glasurit 923-55 clearcoat commercially available from BASF corporation, 929-91 Isocyanate hardener commercially available from BASF Corporation, and 352-91 reducer, commercially available from BASF Corporation, were combined in a 2:1:10% ratio and applied via air atomization over a black basecoated substrate, allowed to air dry for 15 minutes and baked at 140° F. for 30 minutes, and then allowed to cure for 1 week at 73° F. The resultant film had a 20° gloss of 9%; a significant change in gloss from the initial application.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A resin comprising a reaction product of:
    an oligomer or polymer comprising an acrylic having a number average molecular weight of from 2,500 to 4,000 g/mol, said oligomer or polymer having reactive functionality thereon selected from hydroxyl, carboxyl, anhydride, isocyanate, and epoxide functional groups; and
    a polyolefin that is different from said oligomer or polymer and having a functional group selected from acrylate, methacrylate, carboxyl, hydroxyl, epoxide, anhydride and isocyanate functional groups, the polyolefin having a number average molecular weight of from 350 to 700 g/mol;
    wherein said functional group of said polyolefin is reactive with said reactive functionality of said oligomer or polymer;
    wherein said oligomer or polymer and said polyolefin are at least partially immiscible in solution at ambient temperature; and
    wherein said polyolefin is reacted in an amount of from 15 to 50 parts by weight and said oligomer or polymer is reacted in an amount of from 50 and 85 parts by weight, based on 100 parts by weight of the components utilized to form said resin.

2. A resin as set forth in claim 1 wherein said oligomer or polymer has a first polarity and said polyolefin has a second polarity that is opposite said first polarity.

3. A resin as set forth in claim 1 wherein said polyolefin is selected from polyethylene, polypropylene, polybutylene, and combinations thereof.

4. A resin as set forth in claim 1 wherein said polyolefin is a crystalline polyalkylene.

5. A resin as set forth in claim 1 wherein said oligomer or polymer is produced from monomers selected from methyl methacrylate, butyl methacrylate, hydroxyethyl methacrylate, hydroxypropyl methacrylate, glycidyl methacrylate, and combinations thereof, and
    wherein said oligomer or polymer has reactive functionality thereon selected from hydroxyl, carboxyl, epoxide, anhydride and isocyanate functional groups.

6. A resin as set forth in claim 1 further defined as a graft polymer.

7. A resin as set forth in claim 1 having a glass transition temperature of from −20° C. to 100 C.

8. A resin as set forth in claim 1, consisting of said reaction product of said oligomer or polymer comprising said acrylic and said polyolefin.

9. A resin comprising a reaction product of:
    an oligomer or polymer comprising an acrylic having a number average molecular weight of from 2,500 to 4,000 g/mol, said oligomer or polymer having reactive functionality thereon selected from hydroxyl, carboxyl, epoxide, anhydride, and isocyanate functional groups; and a crystalline polyalkylene having a functional group selected from carboxyl and hydroxyl functional groups which is reactive with said reactive functionality of said oligomer or polymer, the crystalline polyalkylene having a number average molecular weight of from 350 to 700 g/mol;

wherein said oligomer or polymer and said crystalline polyalkylene are at least partially immiscible in solution at ambient temperature; and wherein said crystalline polyalkylene is reacted in an amount of from 15 to 50 parts by weight and said oligomer or polymer is reacted in an amount of from 50 and 85 parts by weight, based on 100 parts by weight of the components utilized to form said resin.

10. A resin as set forth in claim 9 wherein said oligomer or polymer has a first polarity and said polyolefin has a second polarity that is opposite said first polarity.

11. A resin as set forth in claim 9 further defined as a graft polymer.

12. A resin as set forth in claim 9, consisting of said reaction product of said oligomer or polymer comprising said acrylic and said crystalline polyalkylene.

13. A method of forming a resin, said method comprising the steps of:
providing an oligomer or polymer comprising an acrylic having a number average molecular weight of from 2,500 to 4,000 g/mol, the oligomer or polymer having a reactive functionality thereon selected from hydroxyl, carboxyl, anhydride, epoxide and isocyanate functional groups;

providing a polyolefin that is different from the oligomer or polymer which has a functional group that is selected from acrylate, methacrylate, anhydride, carboxyl, hydroxyl, epoxide, and isocyanate functional groups, the polyolefin having a number average molecular weight of from 350 to 700 g/mol; and grafting the oligomer or polymer with the polyolefin to form the resin;

wherein the functional group of the polyolefin is reactive with the reactive functionality of the oligomer or polymer;

wherein the oligomer or polymer and the polyolefin are at least partially immiscible in solution at ambient temperature; and wherein the polyolefin is reacted in an amount of from 15 to 50 parts by weight and the oligomer or polymer is reacted in an amount of from 50 and 85 parts by weight, based on 100 parts by weight of the components utilized to form the resin.

14. A method as set forth in claim 13 wherein the oligomer or polymer has a first polarity and the polyolefin has a second polarity that is opposite the first polarity.

15. A method as set forth in claim 13 wherein the polyolefin is reacted in an amount of from 15 to 45 parts by weight based on 100 parts by weight of the components utilized to form the resin.

16. A method as set forth in claim 13 with the method consisting of the steps as recited in claim 13.

17. A coating system comprising:
a substrate; and
a cured film disposed on said substrate and formed from a coating composition comprising:
a solvent component;
a resin comprising a reaction product of:
an oligomer or polymer comprising an acrylic having a number average molecular weight of from 2,500 to 4,000 g/mol, said oligomer or polymer having reactive functionality thereon selected from hydroxyl, carboxyl, epoxide, anhydride and isocyanate functional groups, wherein said oligomer or polymer optionally comprises functionality for crosslinking; and a polyolefin that is different from the oligomer or polymer which has a functional group selected from carboxyl, hydroxyl, epoxide, isocyanate, anhydride, acrylate and methacrylate functional groups, the polyolefin having a number average molecular weight of from 350 to 700 g/mol, wherein the functional group of the polyolefin is reactive with the oligomer or polymer;

wherein said oligomer or polymer and said polyolefin are at least partially immiscible in solution at ambient temperature; and wherein said polyolefin is reacted in an amount of from 15 to 50 parts by weight and said oligomer or polymer is reacted in an amount of from 50 and 85 parts by weight, based on 100 parts by weight of the components utilized to form said resin; and optionally a crosslinking agent;
wherein said cured film has a gloss of less than 35 gloss units as measured by a glossmeter at 20.

* * * * *